Nov. 2, 1971 R. W. GRAY ET AL 3,616,771
EDGE GUIDANCE MECHANISM FOR FLEXIBLE SHEET MATERIAL
Filed March 13, 1970
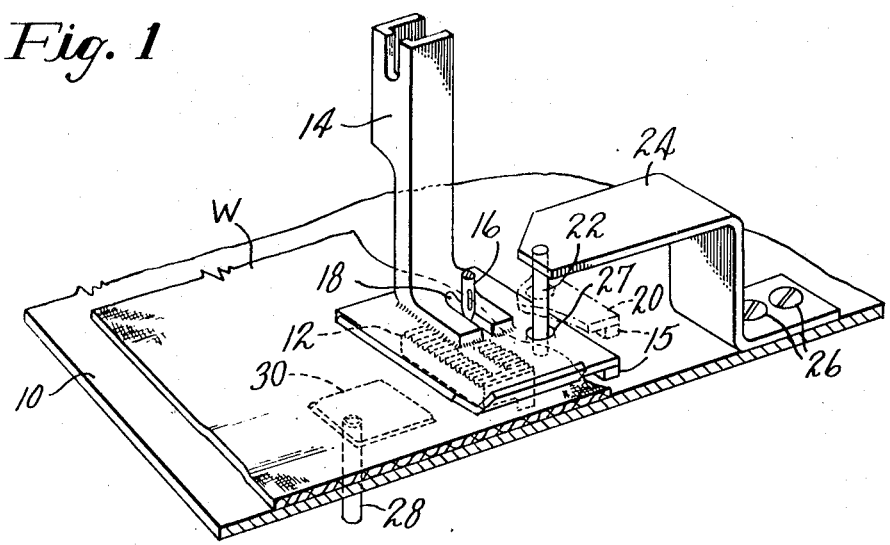
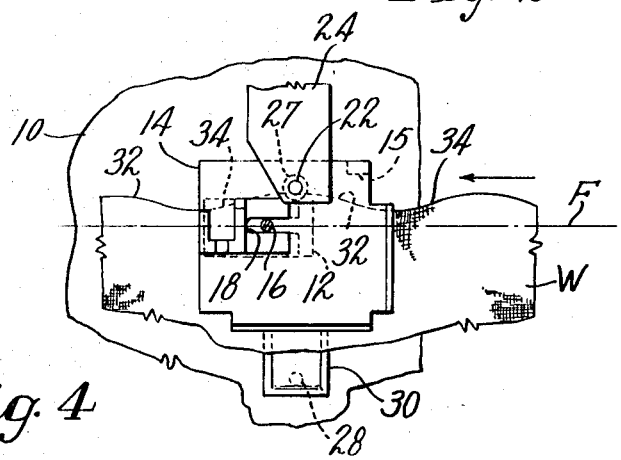
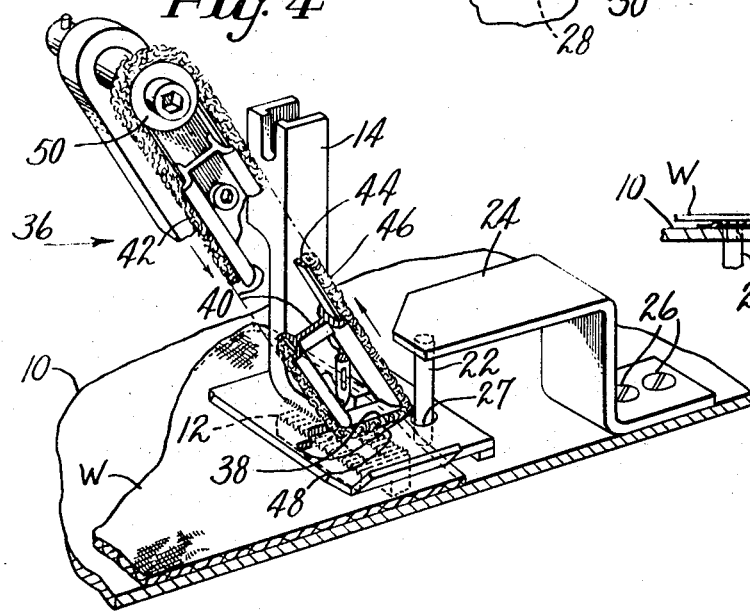
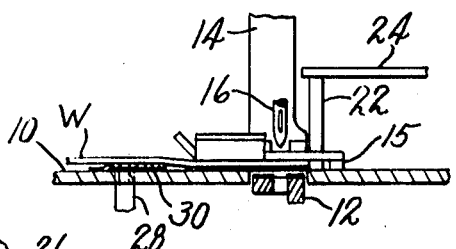
Inventors
Richard W. Gray
Paul E. Morgan
Paul G. Rumball
By their Attorney
Carl E. Johnson

United States Patent Office 3,616,771
Patented Nov. 2, 1971

3,616,771
EDGE GUIDANCE MECHANISM FOR FLEXIBLE SHEET MATERIAL
Richard W. Gray, Marblehead, Paul E. Morgan, Melrose, and Paul G. Rumball, Beverly, Mass., assignors to USM Corporation, Boston, Mass.
Filed Mar. 13, 1970, Ser. No. 19,257
Int. Cl. D05b 35/10
U.S. Cl. 112—153            2 Claims

ABSTRACT OF THE DISCLOSURE

A sewing machine bed, for instance, is provided, ahead of its stitch forming mechanism, with an edge gage and means acting normal to the direction of feed of a feed dog and presser foot for urging the margin of a workpiece yieldingly against the edge gage, whereby the workpiece receives a seam parallel to its marginal edge even if the latter is curvilinear.

CROSS REFERENCE FOR RELATED APPLICATION

An application Ser. No. 9,185 was filed Feb. 6, 1970 in the name of Paul Morgan and relates to an air flow work orienting mechanism.

BACKGROUND OF THE INVENTION

Manufacture of apparel and other articles often requires that a seam be sewn parallel to an edge. Particularly when a workpiece is flimsy and of irregular shape the operation becomes burdensome since practically constant manual guidance is ordinarily required. Several prior approaches have been proposed for automatically guiding a workpiece relative to an intermittently operative tool such as a needle. Most of these, such as that disclosed in United States Letters Patent No. 3,080,836, issued Mar. 12, 1963 in the names of John E. Clemens et al., disclose somewhat complex mechanism whereby a steering torque is exerted in accordance with curvature of the work edge as sensed in the operating locality of the tool. While such guidance mechanisms are generally useful and reliable, it is desirable to provide a simpler guidance arrangement in many cases even though some sacrifice of precision be entailed.

SUMMARY OF THE INVENTION

A main object is to provide an improved, simple work guidance means operable continuously and yieldingly on a workpiece. It is another and more specific object of this invention to provide in a machine, for instance a sewing machine having feed mechanism operative in the intervals when a workpiece is disengaged from a tool such as a needle, a simplified guidance device for automatically determining the operating path of the tool substantially parallel to an edge of the work.

To this end in one illustrative embodiment a feature of the invention resides in providing in combination with a sewing machine having a needle, presser foot, and cooperative feed dog, a continuously operative device for yieldingly urging a workpiece in its own plane normal to the direction of feed and against an edge gage, the device being operative to tend to pivot the work about the needle when engaging the work, and at other times to effect a counter-reaction of the gage on the margin of the work.

It will be understood that the invention is applicable to machines other than sewing machines, for instance cementing or other attaching machines wherein margins are to be operated upon.

BRIEF DESCRIPTION OF THE DRAWINGS

The foregoing and other features of the invention will now be more particularly described in connection with preferred embodiments and with reference to accompanying drawings thereof, in which:

FIG. 1 is a perspective of a portion of a sewing machine having a workpiece on its bed, and provided with a pneumatic edge guidance device cooperating with stitch forming and feeding mechanisms;

FIG. 2 is a plan view of the operating instrumentalities shown in FIG. 1;

FIG. 3 is a view in elevation, looking along the line of feed and toward the presser foot shown in FIGS. 1 and 2, and FIG. 4 is a view corresponding largely to FIG. 1 and illustrating an alternate construction when a light friction means is substituted.

DESCRIPTION OF THE PREFERRED EMBODIMENTS

Referring first to FIGS. 1-3 inclusive, a flat bed 10 of a largely conventional sewing machine is formed with an opening for enabling a feed dog 12 to cooperate in orbital manner with the underside of a presser foot 14. For a purpose subsequently indicated, the presser foot 14 includes a depending spacer portion 15 extending beneath the underside of the presser foot at a locality where the spacer will not engage a workpiece W. The workpiece W is inserted edgewise between the presser foot and feed dog to be fed from right to left along a straight line F (FIG. 2) in increments. A vertically reciprocable needle 16 is operable in a slot 18 of the presser foot in usual manner. It will be understood that the presser foot may be lifted to an out of the way position when desired and is spring-pressed downwardly. In FIG. 1 dash lines at 20 indicate an upper position to which the presser foot 14 may be urged by the feed dog 12 in the course of work feeding.

Guidance mechanism to be described comprises an edge gage 22 in the form of a vertical pin. It is supported by an angular arm 24 secured to the bed by screws 26 and preferably extends freely through an aperture 27 in the presser foot. In the construction shown in FIGS. 1-3, the edge guidance means also includes an air flow device having an inlet 28 in the bed, a deflector 30 thereon for receiving air from the inlet and directing it in a stream parallel to the bed, beneath the workpiece, ahead of the needle, and toward the edge gage 22. The continuous stream of air thus flows generally normal to the line F of mechanical work feeding and is effective, when the work is not clamped by the presser foot and feed dog, to urge the work counter-clockwise (as seen in FIGS. 1 and 2) about the axis of the needle 16 while it is penetrating the work. The spacer portion 15 on contacting the bed 10 insures that when the presser foot is in lowermost position, the feed dog having retracted downwardly, the air stream will not be blocked by the presser foot but can effect steering of the work about the needle. Such pivotal movement of the work in the operating zone is limited by edge engagement of the work with the gage 22, any relative sliding movement of the work with respect to the bed 10 being facilitated by the air bearing effect provided by the continuous air stream.

It will be appreciated from the foregoing that during each interval of work steering by means of the air flowing along the underside of the work, no actual turning moment will be effected when the work edge extends parallel to the straight line of feed F imparted by the presser foot 14 and feed dog 12. However, when a portion (such as those marked 34 in FIG. 2) of the edge of the work progressively contacting the gage 22 deviates outwardly with respect to the straight line of feed F, there is an accommodating reactionary force applied by the gage to the work margin thereby properly turning the work clockwise as viewed in FIG. 2 about the axis of the needle. When other marginal portions such as those indicated at 32 in FIG. 2 deviate inwardly with respect to the line F, they are progressively kept in yielding contact with the gage 22 by reason of the air stream turning the operating locality of the work piece counterclockwise about the needle axis. It will be understood that, though not herein shown, a valve may be provided for adjusting the volume and/or speed of the air flow into the inlet 28, greater flow and speed usually being required for heavier fabrics, for instance, and less being needed for flimsier materials.

In FIG. 4 a construction similar to that above described is shown except that in lieu of an air stream being applied for working steering, a light friction means generally designated 36 is applied as next explained. As herein illustrated a slot 38 is provided in the presser foot 14 in a locality above the feed dog 12 and between the needle 16 and the gage 22. In this slot is disposed an elongated, inclined conveyor track 40 for rotatably supporting an endless friction belt 42. As indicated in FIG. 4 the belt 42 preferably includes a backing strip 44 and a work engaging fibrous material 46. This material is usually characterized by being soft and fluffy thereby enabling its free fibre ends to apply only a light frictional force for wiping and yieldably urging the work normal to its line of feed and against the edge gage 22. As shown the fibrous material has light frictional contact over a short work locality 48 wherein it is guided by the track 40 parallel to the work surface and approximately up to the work edge. The width of the belt 42, measured transversely thereof and along the direction of mechanical work feed, is preferably quite narrow (on the order of one-tenth of an inch) to avoid interference with presser foot and feed dog cooperation.

The arrangement shown in FIG. 4 operates essentially in the same manner as above described with reference to FIGS. 1–3, the light frictional work-steering force being continuously operative as the belt 42 is driven by means of a rotary wheel 50 journaled in the upper end of the track 40 and engageable with the backing strip 44. The belt tends to apply steering influence counterclockwise about the needle 16 when it is down and able to serve as a pivot. There is a tendency to clockwise rotation of the work at other times about the needle as pivot, overcoming influence of the belt, due to reaction force exerted by the edge gage. Accordingly, for a straight edged portion of the work there is a net tendency due to the belt 42 to maintain edge contact with the gage 22 without disturbing straight line feed. Deviation in marginal curvature enables the belt 42 and the gage to compensate approximately for such curvature whereby the seam generally follows the curved work edge. In general it is found that the presser foot 14 in this arrangement may be made less yieldable upwardly during operation than in the case of the alternate structure of FIGS. 1–3, thereby insuring that no undue frictional interference with the belt is caused by operation of the feed dog. When preferred, of course, the friction means 36 as a whole may be mounted to yield heightwise.

Having thus described our invention, what we claim as new and desire to secure by Letters Patent of the United States is:

1. The combination with a sewing machine having a bed for slidably supporting a workpiece having a straight and/or curvilinear edge, stitch forming mechanism including a reciprocable needle, and work feeding mechanism operative rectilinearly to advance the work on the bed when the needle is disengaged from the work, of a work guidance device comprised of an edge gage ahead of the needle and having a rounded surface for point contact with the work edge, and guidance mechanism operative ahead of the needle and generally normal to the direction of said rectilinear advance to urge an edge of the work yieldingly against the edge gage, said guidance mechanism including an inlet for directing air parallel to the bed and along the underside of the work and being effective pivotally on the work about the needle when it engages the work.

2. The combination as set forth in claim 1 wherein the work feeding mechanism includes a vertically reciprocable presser foot and a feed dog arranged in intermittently cooperative relation, the presser foot being yieldably mounted and having a spacer portion remote from the gage and arranged to abut the bed whereby the foot avoids blocking the air flow from said inlet to the gage.

References Cited

UNITED STATES PATENTS

| | | | |
|---|---|---|---|
| 3,496,891 | 2/1970 | Kosrow et al. | 112—153 X |
| 3,204,591 | 9/1965 | Pickett | 112—Dig. 2 |
| 2,573,170 | 10/1951 | Wiegandt | 112—151 |
| 3,204,590 | 9/1965 | Rockerath et al. | 112—203 X |
| 3,099,970 | 8/1963 | Hite | 112—Dig. 2 |
| 2,630,772 | 3/1953 | Ederer | 112—136 X |

H. HAMPTON HUNTER, Primary Examiner